United States Patent
Huang

(10) Patent No.: US 10,315,213 B2
(45) Date of Patent: Jun. 11, 2019

(54) AUTOMATIC ADJUSTABLE SHOWERHEAD

(71) Applicant: Beijing Kohler Ltd., Miyun County (CN)

(72) Inventor: Guangyin Huang, Shi Tang town (CN)

(73) Assignee: BEIJING KOHLER LTD. (CN)

( * ) Notice: Subject to any disclaimer, the term of this patent is extended or adjusted under 35 U.S.C. 154(b) by 217 days.

(21) Appl. No.: 15/334,789

(22) Filed: Oct. 26, 2016

(65) Prior Publication Data

US 2017/0120283 A1    May 4, 2017

(30) Foreign Application Priority Data

Oct. 28, 2015   (CN) .................... 2015 2 0845076 U

(51) Int. Cl.
  *F16L 27/047* (2006.01)
  *B05B 15/654* (2018.01)
  *B05B 1/18* (2006.01)

(52) U.S. Cl.
  CPC ............. *B05B 15/654* (2018.02); *B05B 1/18* (2013.01); *B05B 1/185* (2013.01); *F16L 27/047* (2013.01)

(58) Field of Classification Search
  CPC ........ F16L 27/047; B05B 15/654; B05B 1/18; B05B 1/185; B05B 15/067
  See application file for complete search history.

(56) References Cited

U.S. PATENT DOCUMENTS

| | | | | |
|---|---|---|---|---|
| 2,560,279 A | * | 7/1951 | Curtis | B05B 1/18 239/587.4 |
| 3,887,136 A | * | 6/1975 | Anderson | B05B 15/654 239/460 |
| 4,275,908 A | | 6/1981 | Elkins et al. | |
| 4,324,364 A | * | 4/1982 | Buzzi | B05B 1/1627 239/381 |
| 5,398,872 A | * | 3/1995 | Joubran | B05B 1/1654 239/99 |

(Continued)

FOREIGN PATENT DOCUMENTS

| | | |
|---|---|---|
| CA | 2688817 A1 | 6/2011 |
| DE | 20300448 U1 | 3/2003 |
| FR | 3045419 A3 * | 6/2017 ............... B05B 1/18 |

OTHER PUBLICATIONS

Extended European Search Report issued in corresponding application No. 16196223.8 dated Mar. 20, 2017.

*Primary Examiner* — David Bochna
(74) *Attorney, Agent, or Firm* — Foley & Lardner LLP

(57) ABSTRACT

A showerhead structure includes a ball assembly and a showerhead assembly. The ball assembly includes a ball body, a wearing proof sheet, a locating ring, a connection nut and a fixing nut. The wearing proof sheet supports the upper half of the ball body, and the locating ring supports the lower half of the ball body. The connection nut and the fixing nut are used for connecting the ball assembly and the showerhead assembly. The ball assembly includes an irregular-shaped gasket disposed between the wearing proof sheet and the locating ring. When the connection nut and the fixing nut are tightened, the irregular-shaped gasket is used for sealing the ball body. The wearing proof sheet and the ball body are in clearance fit. The showerhead structure can automatically adjust to a horizontal position under the action of its own weight to prevent one side of the showerhead from dripping.

20 Claims, 5 Drawing Sheets

(56) References Cited

U.S. PATENT DOCUMENTS

| | | | | |
|---|---|---|---|---|
| 2001/0008256 A1* | 7/2001 | Marsh | ................... | B05B 1/1654 |
| | | | | 239/381 |
| 2012/0267455 A1* | 10/2012 | Hansen | ..................... | B05B 1/18 |
| | | | | 239/547 |
| 2013/0001324 A1* | 1/2013 | Miedzius | .............. | B05B 1/3086 |
| | | | | 239/439 |
| 2013/0312175 A1* | 11/2013 | Huffington | ............ | B05B 15/654 |
| | | | | 4/615 |
| 2013/0340854 A1* | 12/2013 | Quinn | .................... | B05B 1/185 |
| | | | | 137/343 |

* cited by examiner

FIG. 4 (Detail A)

AUTOMATIC ADJUSTABLE SHOWERHEAD

CROSS-REFERENCE TO RELATED PATENT APPLICATIONS

The present application claims the benefit of and priority to Chinese Utility Model Application No. 201520845076.4, filed Oct. 28, 2015 (now Chinese Utility Model No. CN205182975U), which is incorporated herein by reference in its entirety.

BACKGROUND

The present application relates to the technical field of bathroom fixtures. More specifically, this application relates to showerhead structures that can automatically adjust to a horizontal position.

SUMMARY

One embodiment relates to a showerhead structure that includes a ball assembly and a showerhead assembly. The ball assembly includes a ball body, a wearing proof sheet, a locating ring, a connection nut, a fixing nut and a gasket. The wearing proof sheet supports an upper half of the ball body, and the locating ring supports a lower half of the ball body. The connection nut and the fixing nut are configured to connect the ball assembly and the showerhead assembly together. The gasket, which may have an irregular-shaped, is disposed between the wearing proof sheet and the locating ring. The connection nut and the fixing nut are tightened together to seal the ball body by the gasket, and the wearing proof sheet and the ball body are in a clearance fit.

One advantageous feature of the showerhead structure described herein is that such showerhead structure that can automatically adjust to a horizontal position. For example, according to an exemplary embodiment, a showerhead structure includes a ball assembly and a showerhead assembly. The ball assembly may include a ball body, a wearing proof sheet, a locating ring, a connection nut and a fixing nut, where the wearing proof sheet is used for supporting the upper half of the ball body, where the locating ring is used for supporting the lower half of the ball body, and where the connection nut and the fixing nut are used for connecting the ball assembly and the showerhead assembly.

The ball assembly may further include a gasket. For example, the ball assembly may include an irregular-shaped gasket that is disposed between the wearing proof sheet and the locating ring. The irregular-shaped gasket may be used for sealing the ball body, such as when the connection nut and the fixing nut are tightened and the wearing proof sheet and the ball body are in clearance fit.

Furthermore, the cross section of the gasket (e.g., the irregular-shaped gasket) may be V-shaped, and the opening of the V-shape may face toward the bottom of the ball body.

Furthermore, the gasket (e.g., the irregular-shaped gasket) may include a locating block, and/or the locating ring may include a locating groove, such that the locating block may be inserted into (e.g., received in) the locating groove.

Furthermore, the locating ring may extend downward to form a boss and/or a recess may be formed on the connection nut, such that the boss may be inserted into the recess.

Furthermore, the showerhead assembly may sequentially include a front plate, a silicone sheet, and a back plate. The fixing nut may extend (e.g., run) through the back plate to be connected with the connection nut.

Furthermore, the ball assembly may include a ball nut. The ball nut may be configured to encircle the wearing proof sheet, the locating ring, and/or the connection nut. The ball nut may be connected with the connection nut and may compress the wearing proof sheet and the locating ring.

Furthermore, an installation groove may be formed on the connection nut and/or an O-ring gasket may be disposed (e.g., installed) inside the installation groove. The O-ring gasket may seal (e.g., may be used for sealing) the gap between the ball nut and the back plate.

Furthermore, the irregular-shaped gasket may be made of and/or include a rubber material.

Another embodiment relates to a showerhead configured to mount to a water supply line. The showerhead includes a body, a pivot assembly, and a showerhead assembly. The body includes a spherical member and a fluid passage extending in a longitudinal direction and fluidly connected to the water supply line. The pivot assembly includes a sleeve, an annular ring, and a gasket. The sleeve is configured to encircle a first portion of the spherical member with a first gap between at least a part of the sleeve and the first portion. The ring is configured to encircle a second portion of the spherical member with a second gap between at least a part of the ring and the second portion. The gasket is disposed between the sleeve and the ring in the longitudinal direction, wherein the gasket contacts the spherical member. The showerhead assembly is freely rotatable relative to and about the spherical member through the pivot assembly, so that the showerhead automatically adjusts to a horizontal position due to gravity.

Furthermore, the sleeve may be supported by an upper half of the spherical member, and the ring may be supported by a lower half of the spherical member.

Furthermore, an upper portion of the sleeve may contact a first portion of the upper half of the spherical member, and a lower portion of the sleeve may extend around a second portion of the upper half and a first portion of the lower half of the spherical member with the first gap therebetween.

Furthermore, the showerhead may also include a connection nut disposed between the ball nut, the showerhead assembly, and the ring. The connection nut may have a polygonal recess that receives a mating polygonal boss in the ring.

Furthermore, the showerhead may also include a fixing nut having external threads that thread to internal threads of the connection nut. The connection nut and the fixing nut are tightened together to seal the spherical member by the gasket.

Furthermore, the showerhead may also include a ball nut surrounding the sleeve, the ring, and the gasket. The gasket may include an outer portion that is retained between the ring and the ball nut. The ball nut, if provided, may be connected to the connection nut to compress at least one of the sleeve, the gasket, and the ring.

Furthermore, the fixing nut, if provided, may be retained between a front plate and a back plate of the showerhead assembly. The fixing nut, if provided, may include external threads that thread to internal threads of the connection nut to couple the fixing and connection nuts together.

Furthermore, the gasket may include a base that is disposed between an upper portion of the ring and a ball nut. The gasket may include an arm that extends inwardly from an upper end of the base between the upper portion of the ring and a lower portion of the spherical member. The gasket may include a foot that extends inwardly from a lower end of the base between the upper portion of the ring and a lower portion of the ring.

The showerhead structures of this application may provide several advantages. For example, the showerhead structure can automatically adjust to a horizontal position under the action of its own weight, since the wearing proof sheet and the ball body are in clearance fit, and the wearing proof sheet is not compressed against the ball body. This arrangement may prevent the showerhead from dripping, such as from one side thereof. Also, for example, the irregular-shaped gasket may improve sealing the ball body.

DETAILED DESCRIPTION

In the bathroom equipment industry, most showerheads are designed to have an adjustable angular position to accommodate different users of the shower, and remain in the adjusted angular position until manipulated into a different angle. Such showerheads can present problems, such as, for example in cleaning. Since the showerheads are not in a horizontal position when closed, it is easy to see water dripping at one side of the showerheads. A long period of dripping causes inconvenience to cleaning, which is particularly severe in hotels. Some showerheads that remain in an adjusted angular position can be adjusted to a horizontal position using tools, such as a leveling instrument, which is inconvenient. Other showerheads are not even adjustable into a horizontal position.

Specific embodiments disclosed in this application will be described below in greater detail along with reference to the accompanying drawings.

Figure 1:
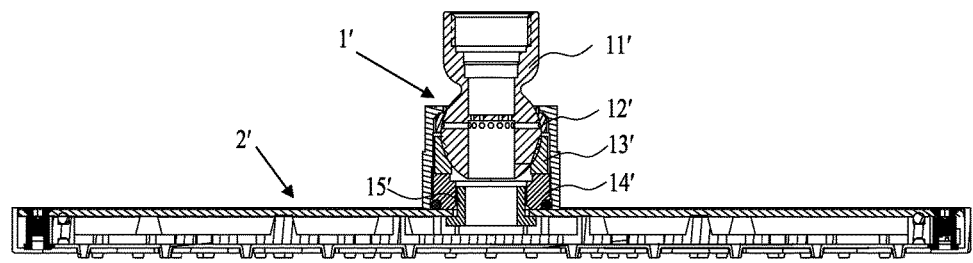
FIG. 1 is a cross-sectional view of an exemplary embodiment of a showerhead structure having a wearing proof sheet compressed against a ball body.
Figure 2:
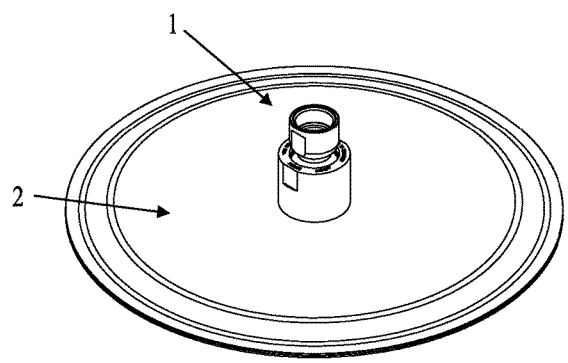
FIG. 2 is a perspective view of an exemplary embodiment of a showerhead structure having a gasket.

FIG. 1 illustrates a showerhead structure having a ball assembly 1' and a showerhead assembly 2'. The ball assembly 1' comprises a ball body 11', a wearing proof sheet 12', a locating ring 13', a connection nut 14' and a fixing nut 15'. The wearing proof sheet 12' is compressed against the ball body 11' to play a role of damper when the ball body 11' rotates, and at the same time, for sealing the ball body 11'. The locating ring 13' is used for supporting the lower half of the ball body 11'. The connection nut 14' and the fixing nut 15' are used for connecting the ball assembly 1' and the showerhead assembly 2'.

As shown in FIG. 1, the wearing proof sheet 12' is compressed against (i.e., directly contacts) the ball body 11' around a profile of the ball body 11' (e.g., a circumferential portion). When the ball body 11' is rotated to a specific angle, the wearing proof sheet 12' (at least in part) compresses against the ball body 11', such that the showerhead assembly 2' remains at the specific angle relative to the ball body 11'. The showerhead shown in FIG. 1 makes it easy for a user to adjust the angle, but it may cause difficulties in cleaning.

FIGS. 2-5 illustrate an exemplary embodiment of a showerhead structure that can automatically adjust to a horizontal position may eliminate or ameliorate the problems in cleaning the showerhead. As shown in FIGS. 2-5, the showerhead structure (e.g., showerhead, spray head, etc.) includes a ball assembly 1 and a showerhead assembly 2. The ball assembly 1 of the showerhead structure includes a ball body 11, a wearing proof sheet configured as a sleeve 12, a locating ring 13, a connection nut 14 and a fixing nut 15.

The ball body 11 includes an inlet end that is configured to attach (e.g., couple, mount, etc.) the showerhead structure to an inlet pipe. The inlet end of the body ball 11 receives water from a source. The ball body 11 also includes a spherical member configured to rotatably support other elements/members of the showerhead structure.

Figure 4:
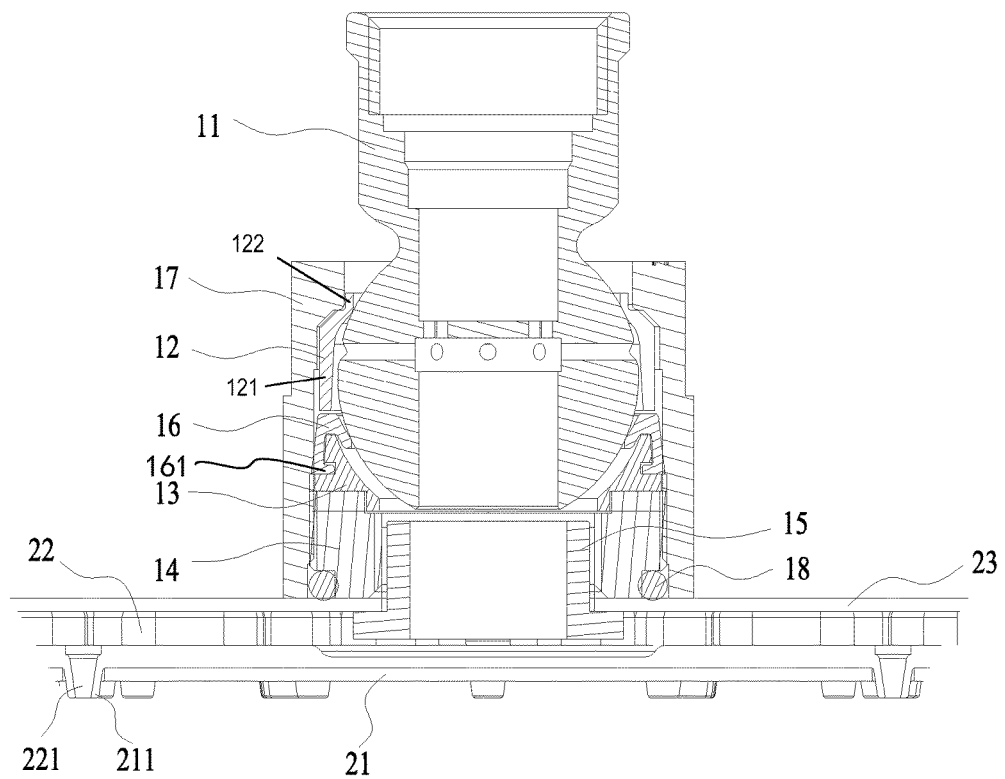
FIG. 4 is an enlarged detail view of the portion A of the showerhead structure shown in FIG. 3.
Figure 5:
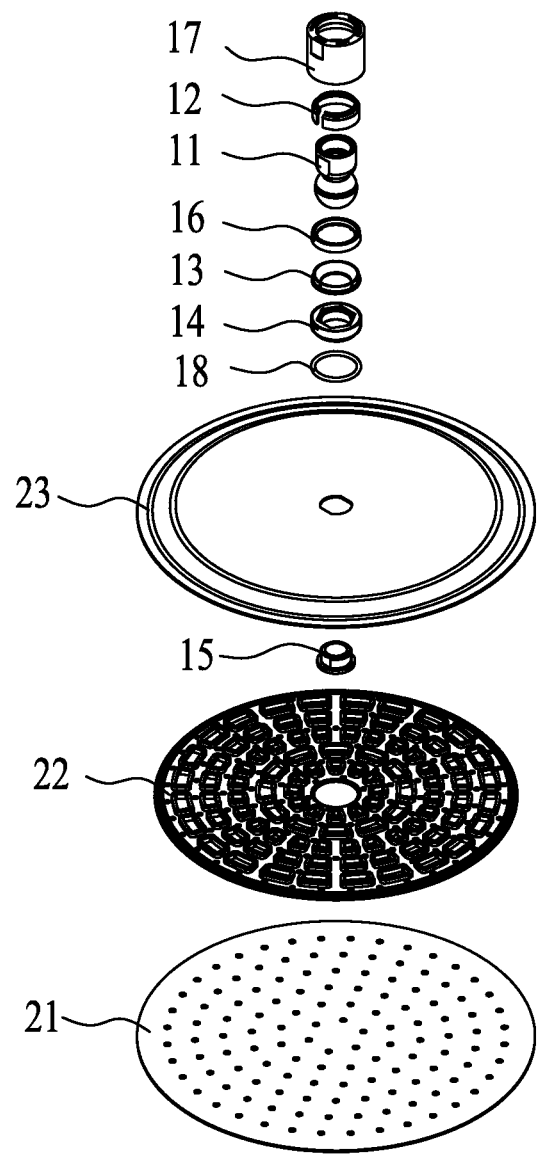
FIG. 5 is an exploded view of the showerhead structure shown in FIG. 2.

As shown best in FIG. 4, the sleeve 12 is supported by an upper half of the ball body 11, such as the upper half of the spherical member of the ball body 11. The sleeve 12 may be rotatably supported by the spherical member so that the sleeve 12 can be rotated relative to the ball body 11. The sleeve 12 and the ball body 11 may be configured to include a clearance fit (e.g., a gap, a space, etc.) therebetween. For example, a gap may be disposed between a lower portion 121 of the sleeve 12 and the spherical member of the ball body 11. A part of the sleeve 12 (e.g., an upper portion 122) may contact part of the spherical member or may have a gap therebetween as well. As shown in FIGS. 4 and 5, the sleeve 12 is located between the ball nut 17 and the spherical member of the ball body 11. The ball nut 17 may include a stop (e.g., a projection) that limits travel of the sleeve 12 in a longitudinal direction (e.g., the direction the fluid passage of the ball body 11 extends).

The locating ring 13 is supported by a lower half of the ball body 11, such as the lower half of the spherical member of the ball body 11. The locating ring 13 may be rotatably supported by the spherical member so that the locating ring 13 can be rotated relative to the ball body 11. For example, the locating ring 13 may be supported by the spherical member through the gasket 16, such that a portion of the gasket 16 contacts the spherical member (e.g., a lower portion thereof) and the locating ring 13 is offset from the spherical member with a gap therebetween.

The connection nut 14 and the fixing nut 15 may be used to connect the ball assembly 1 and the showerhead assembly 2 together. For example, external threads of the fixing nut 15 may thread to internal threads of the connection nut 14 to couple the nuts together. The fixing nut 15 may include a head that retains at least a portion of the showerhead assembly 2 in place to couple the showerhead assembly 2 to the ball assembly 1.

The ball assembly 1 may include a gasket. For example, the ball assembly 1 may include the irregular-shaped gasket 16 that is disposed between the sleeve 12 and the locating ring 13 in FIGS. 6 and 7. The gasket 16 may seal the ball assembly 1. For example, the gasket 16 may seal (e.g., be used for sealing) the ball body 11 of the ball assembly 1, such as when the connection nut 14 and the fixing nut 15 are tightened and/or when there is a clearance fit between the sleeve 12 and the ball body 11.

Figure 3:
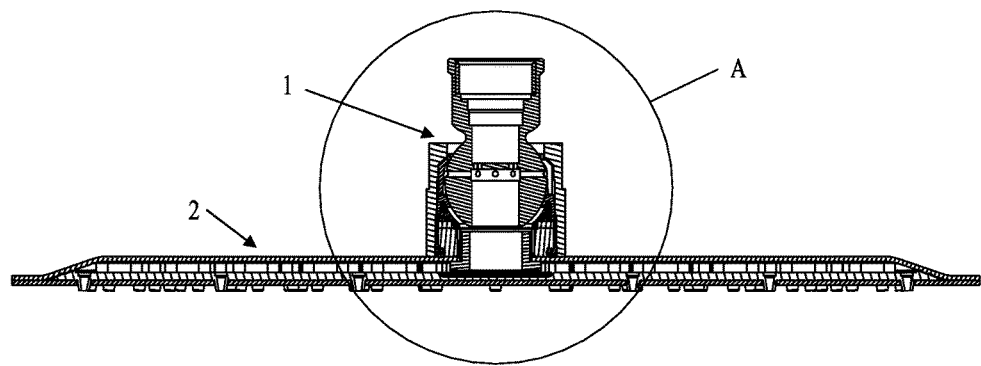
FIG. 3 is a cross-sectional view of the showerhead structure shown in FIG. 2.

The sleeve 12 may be configured to allow free rotation of the showerhead assembly 2 relative to the ball assembly 1. As shown in FIGS. 3 and 4, the sleeve 12 is configured not to press against (e.g., contact, be compressed against) the ball body 11, so that the sleeve 12 will not keep (e.g., maintain) the showerhead assembly 2 at an alignment (e.g., an angle) relative to the ball assembly 1, such as when the position of the showerhead assembly 2 is adjusted by a user relative to the ball assembly 1.

Further, since the sleeve 12 does not press/compress against the ball body 11, the sleeve 12 does not seal the ball body 11. To seal the ball body 11, a gasket (e.g., the irregular-shaped gasket 16) is disposed between the sleeve 12 and the locating ring 13. Thus, the irregular-shaped gasket 16 plays a role of sealing the ball body 11. As shown in FIGS. 3 and 4, the gasket 16 includes an outer portion (e.g., wall) that is retained between the locating ring 13 and a ball nut 17, and the gasket 16 also includes an inner portion (e.g., wall) that contacts (e.g., is pressed against) the spherical member of the ball body 11. The inner portion may be configured to be compressed by the ball body 11, the locating ring 13 and/or the ball nut 17.

The gasket 16 contacts the external surface of the ball body 11 to prevent water from leaking between the ball body 11, such as the spherical member, and the gasket 16. The contact between the gasket 16 and the ball body 11 may be configured to prevent leaking of water without maintaining the relative position of the showerhead assembly 2 relative to the ball assembly 1. That is, the compression (e.g., compressive force) between the gasket 16 and the ball body 11 is sufficient to prevent water from passing between the gasket 16 and the ball body 11, but is not sufficient to compress the gasket 16 and/or ball body 11 with such to keep the showerhead assembly 2 at an adjusted angle. As a result, the showerhead structure can be configured to automatically adjust due to gravity, such as, for example, adjust to a horizontal position under the action of its own weight to prevent one side of the showerhead from dripping.

According to the exemplary embodiment shown in FIG. 4, the cross section of the irregular-shaped gasket 16 is generally V shaped. The opening of the V shape may be aligned toward the bottom of the ball body 11 and/or the locating ring 13. The closed end of the V shape may be aligned toward the sleeve 12.

Since water can flow (e.g., run) through the center (e.g., channel) of the ball body 11, water may be able to flow from the bottom of the ball body 11 to where the locating ring 13 is located and can leak from the gap between the locating ring 13 and the ball body 11. Furthermore, since the sleeve 12 and the ball body 11 have a clearance fit, water can leak between the sleeve 12 and the ball body 11.

As the opening of the V-shaped irregular-shaped gasket 16 is toward (e.g., faces) the bottom of the ball body 11, water leaking from the bottom of the ball body 11 is configured to open up the opening of the irregular-shaped gasket 16, such that the irregular-shaped gasket 16 is further compressed against the ball body 11 to prevent water from leaking. Thus, the shape of the gasket 16 advantageously utilizes water leaking between the spherical member of the ball body 11 and the locating ring 13 to prevent the water leaking between the gasket 16 and the ball body 11 by further increasing the pressing force between the gasket 16 and the ball body 11.

Figure 6:
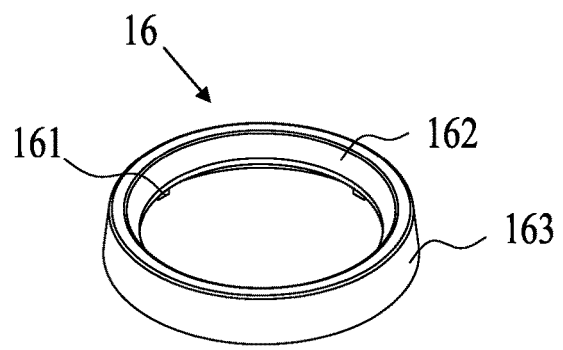
FIG. 6 is a perspective top view of an exemplary embodiment of an irregular-shaped gasket for use in a showerhead structure, such as the showerhead structure shown in FIG. 2.
Figure 7:
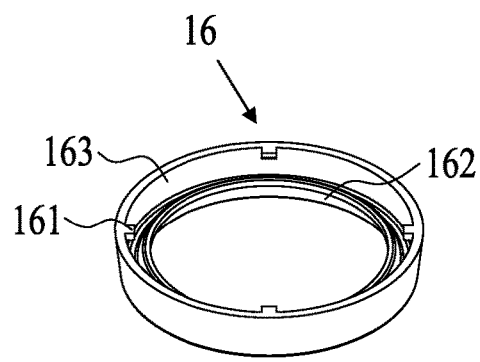
FIG. 7 is a perspective bottom view of the irregular-shaped gasket shown in FIG. 6.

The gasket 16 may include an outer portion 163 (e.g., a base, a slope face, an outer slope face, etc.) and one or more locating blocks 161 (e.g., feet, projections, tabs, fingers, etc.) extending inwardly from the outer portion 163. Each block 161 may be configured to engage a corresponding groove (e.g., recess, channel, notch, indentation, etc.) of another element of the showerhead, such as to retain the gasket 16 in place. For example, the gasket 16 may include a plurality of locating blocks 161 circumferentially spaced and extending radially inward toward a center point of the annular gasket 16. As shown in FIGS. 6 and 7, four locating blocks 161 are provided along an inside edge of the outer portion 163 of the gasket 16, with each block 161 extending radially inwardly toward a center point of the annular gasket 16. The gasket 16 may also include an inner portion 162 (e.g., an inner slope face, an arm, etc.) that is configured to contact the ball body 11. As shown in FIG. 4, the outer portion 163 and the inner portion 162 form a V shape. As shown in FIG. 4, the outer portion 163 is disposed between a first portion of the locating ring 13 and the ball nut 17, the an inner portion 162 extends (e.g., inwardly) from a first side (e.g., first end, top end, etc.) of the outer portion 163 between the first portion of the locating ring 13 and the ball body 11, and the blocks 161 extend (e.g., inwardly) from a second side (e.g., second end, bottom end, etc.) of the outer portion 163 between the first portion of the locating ring 13, which may be adjacent to the spherical member, and a second portion of the locating ring 13, which may be located adjacent to the connection nut 14.

Figure 8:
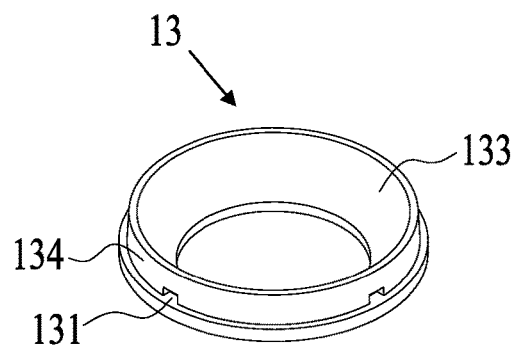
FIG. 8 is a perspective top view of an exemplary embodiment of a locating ring for use in a showerhead structure, such as the showerhead structure shown in FIG. 2.

The locating ring 13 may include one or more locating grooves 131 configured to receive the one or more locating blocks 161. For example, the locating ring 13 may include a plurality of grooves 131 circumferentially spaced around a portion thereof for receiving the plurality of blocks 161. As shown in FIG. 8, the locating ring 13 includes four locating grooves 131 located in a lower portion (e.g., a bottom) of an outer ring 134 of the locating ring 13. The locating ring 13 also includes an inner ring 133 having an inner face proximate a lower portion (e.g., a lower half of the spherical member) of the ball body 11. The inner face may be inclined/sloped relative to the outer ring 134, such as at an oblique angle. The inner face may be concavely shaped, such as complementary to the spherical member of the ball body 11. As shown in FIG. 4, the inner face is configured not to contact the outer surface of the spherical member. The inner ring 133 (e.g., the inner face thereof) is configured to be supported by the ball body 11 (e.g., the spherical member), such as through the gasket 16 to allow relative rotation of the locating ring 13 about the spherical member.

Each locating block 161 of the gasket 16 is inserted into an associated locating groove 131 of the locating ring 13 (see FIG. 4). Thus, each block 161 of the gasket 16 may be configured to engage an associated groove 131 of the locating ring 13 or a portion thereof.

As shown in FIG. 4, the locating blocks 161 are inserted into the locating grooves 131 to achieve the installation of the irregular-shaped gasket 16 and the locating ring 13, and the locating ring 13 plays a role of fixing the irregular-shaped gasket 16. As a result, when water flows between the locating ring 13 and the ball body 11, water opens up the inner portion 162, and the inner portion 162 attaches tightly to the ball body 11 to realize sealing.

It is noted that the number and location of the locating blocks 161 and the locating grooves 131 are not limited, as there may be fewer or additional blocks/grooves that disclosed and the blocks/grooves may be located differently.

Figure 9:
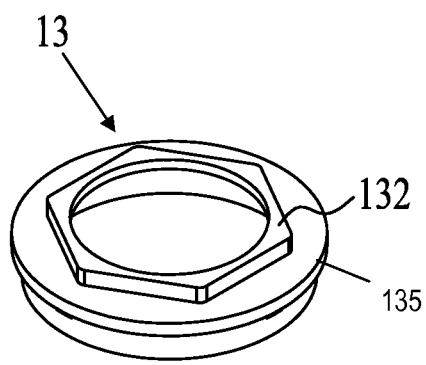
FIG. 9 is a perspective bottom view of the locating ring shown in FIG. 8.
Figure 10:
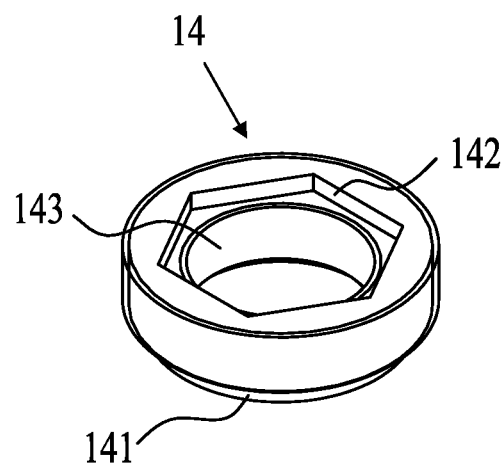
FIG. 10 is a perspective view of a connection nut of a showerhead structure, according to an exemplary embodiment.

As shown in FIG. 9, the locating ring 13 includes a boss 132 that extends downwardly from a base 135. As shown in FIG. 10, the connection nut 14 includes a recess 142 formed in a base. During installation/assembly, the boss 132 of the locating ring 13 is inserted into the recess 142 of the connection nut 14. In this way, the connection nut 14 plays a role in locating the locating ring 13 to facilitate the installation/assembly of the locating ring 13.

As shown in FIGS. 9 and 10, the boss 132 has a regular hexagon shape, and the recess 142 has a complementary regular hexagon shape for aligning the locating ring 13 relative to the connection nut 14. However, it is noted that other suitable shapes may be used to align these elements (e.g., other polygonal shapes). The connection nut 14 may include an inner threaded surface 143, and the inner threaded surface 143 may be used to connect with a threaded surface (e.g., an outer threaded surface) of the fixing nut 15.

As shown best in FIG. 5, the showerhead assembly 2 sequentially comprises a front (e.g., bottom) plate 21, a (e.g., silicone) sheet 22, and a back (e.g., top) plate 23. The fixing nut 15 extends (e.g., runs) through the back plate 23 to connect with the connection nut 14, such as through the mating threads discussed above, to thereby couple (e.g., connect) the ball assembly 1 and the showerhead assembly 2 together.

Edges of the front plate 21 and the back plate 23 may be welded together, such that a space between the front plate 21 and the back plate 23 receives (e.g., accommodates) the silicone sheet 22. The silicone sheet 22 may include one or more than one water outlet. As shown in FIG. 4, each water outlet 221 of the silicone sheet 22 is inserted into a locating hole 211 of the front plate 21. Water is configured to flow from the center of the ball body 11 into the center of the fixing nut 15, and then from the center of the fixing nut 15 into the silicone sheet 22. As guided by the silicone sheet 22, water flows into the one or more water outlets 221 and forms one or more water streams after exiting the showerhead.

The showerhead may also include a ball nut. As shown in FIGS. 4 to 5, the ball assembly 1 includes a ball nut 17, which encircles the sleeve 12, the locating ring 13, and the connection nut 14. The ball nut 17 is connected with the connection nut 14 and is configured to compress the sleeve 12 and/or the locating ring 13.

The showerhead may include an O-ring for sealing the ball nut 17 and another element of the showerhead. As shown in FIG. 10, the connection nut 14 includes an installation groove 141 and an O-ring 18 (e.g., O-ring gasket) is disposed (e.g., installed, assembled, etc.) inside the installation groove 141, so that the O-ring 18 seals (e.g., is used for sealing) the gap between the ball nut 17 and the back plate 23. The O-ring 18 may also seal (e.g., a gap) between the ball nut 17 and the connection nut 14.

According to an exemplary embodiment, the irregular-shaped gasket 16 is compliant (e.g., resilient) and is made of a compliant material. For example, the gasket 16 may include a rubber or similar material. The O-ring 18 may be made of or includes a rubber (e.g., the rubber of the gasket 16). However, the gasket 16 and O-ring 18 may be made of or may include other materials. According to an exemplary embodiment, each of the sleeve 12 and the locating ring 13 is made of or may include a plastic. However, the sleeve 12 and the locating ring 13 may be made of or may include other materials.

The above description provides examples of the showerheads of this application. It is noted that a number of other variations may be made by those skilled in the art based on the examples disclosed, and the variations shall also be encompassed by the scope of this application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure. For example, the terms "up", "down", "top", and "bottom" may refer to the relative orientation of the showerhead structure after installation.

The construction and arrangement of the elements of the showerheads as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., ball body, wearing proof sheet, locating ring, connection nut, fixing nut, gasket, ball nut, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A showerhead structure, comprising:
a ball assembly comprising a ball body, a wearing proof sheet, a locating ring, a connection nut, a fixing nut, and a gasket, wherein the wearing proof sheet supports an upper half of the ball body, and the locating ring supports a lower half of the ball body; and
a showerhead assembly;
wherein the connection nut and the fixing nut are configured to connect the ball assembly and the showerhead assembly;
wherein the gasket has an irregular-shape and is disposed between the wearing proof sheet and the locating ring; and
wherein when each of the connection nut and the fixing nut is in a tightened position, the gasket seals the ball body, and the wearing proof sheet and the ball body are in a clearance fit.

2. The showerhead structure of claim 1, wherein the cross section of the gasket is V shaped, and the opening of the V shape is toward a bottom of the ball body.

3. The showerhead structure of claim 1, wherein the gasket comprises an outer portion and a locating block, which extends inwardly from the outer portion to engage a locating groove in the locating ring.

4. The showerhead structure of claim 3, wherein the gasket comprises an inner portion extending inwardly from the outer portion to seal between the ball body and the locating ring.

5. The showerhead structure of claim 1, wherein the locating ring extends downward to form a boss, which engages a recess of the connection nut.

6. The showerhead structure of claim 1, wherein the showerhead assembly sequentially comprises a front plate, a silicone sheet, and a back plate, and wherein the fixing nut extends through the back plate to connect to the connection nut.

7. The showerhead structure of claim 6, wherein the ball assembly further comprises a ball nut, which encircles the wearing proof sheet, the locating ring, and the connection nut; and wherein the ball nut compresses the wearing proof sheet and the locating ring in a connected position with the connection nut.

8. The showerhead structure of claim 7, wherein the connection nut comprises an installation groove, wherein an O-ring gasket is disposed in the installation groove, and the O-ring gasket seals the gap between the ball nut, the back plate, and the connection nut.

9. The showerhead structure of claim 1, further comprising a ball nut, wherein the gasket is made of rubber and comprises an outer member, which is disposed between a first portion of the locating ring and the ball nut.

10. The showerhead structure of claim 9, wherein the gasket comprises an inner member that extends inwardly from a first end of the outer member between the first portion of the locating ring and the ball body.

11. The showerhead structure of claim 10, wherein the gasket comprises a block that extends inwardly from a second end of the outer member between the first portion of the locating ring and a second portion of the locating ring, which is located adjacent to the connection nut.

12. The showerhead structure of claim 1, wherein the ball assembly further comprises a ball nut, which encircles the wearing proof sheet, the locating ring, and the connection nut.

13. The showerhead structure of claim 12, wherein the ball nut compresses the wearing proof sheet and the locating ring in a connected position with the connection nut.

14. The showerhead structure of claim 12, wherein the connection nut comprises an installation groove, wherein an O-ring gasket is disposed in the installation groove, and the O-ring gasket seals the gap between the ball nut, the back plate, and the connection nut.

15. The showerhead structure of claim 14, wherein the gasket of the ball assembly comprises an outer member disposed between a portion of the locating ring and the ball nut.

16. The showerhead structure of claim 15, wherein the gasket comprises an inner member extending inwardly from an end of the outer member between the portion of the locating ring and the ball body.

17. The showerhead structure of claim 12, wherein the gasket of the ball assembly comprises an outer member, which is disposed between a first portion of the locating ring and the ball nut, and an inner member, which extends inwardly from a first end of the outer member between the first portion of the locating ring and the ball body.

18. The showerhead structure of claim 17, wherein the gasket comprises a block that extends inwardly from a second end of the outer member between the first portion of the locating ring and a second portion of the locating ring, which is located adjacent to the connection nut.

19. The showerhead structure of claim 1, wherein the fixing nut comprises a head, which retains the showerhead assembly, and a threaded shoulder, which threads to internal threads of the connection nut.

20. The showerhead structure of claim 19, wherein the connection nut comprises:
a base having a recess that receives a boss of the locating ring; and
a threaded connection coupled to the ball nut.

* * * * *